US005455640A

United States Patent [19]
Gertsikov

[11] Patent Number: 5,455,640
[45] Date of Patent: Oct. 3, 1995

[54] EYE GLASS SYSTEMS WITH INTEGRAL TIME/TEMPERATURE COMPONENTS

[76] Inventor: Daniel G. Gertsikov, 1241 20th Ave. #1, San Francisco, Calif. 94122

[21] Appl. No.: 181,300

[22] Filed: Jan. 13, 1994

[51] Int. Cl.[6] ................................................. G02C 1/00
[52] U.S. Cl. ................................ 351/158; 351/41
[58] Field of Search .......................... 351/158, 41, 227

[56] References Cited

U.S. PATENT DOCUMENTS

| | | | |
|---|---|---|---|
| 4,751,691 | 6/1988 | Perera | 351/158 |
| 5,276,539 | 1/1994 | Humphrey | 351/158 |

Primary Examiner—William L. Sikes
Assistant Examiner—Hung Xuan Dang

[57] ABSTRACT

An eye glass system with an integral time/temperature component comprising eye glasses is formed with a bow at a central extent thereof and positioned above the eyes of a wearer. Lenses positionable with the bow in front of the eyes of the wearer and with temples extending rearwardly from the ends of the bow positionable over the ears of the wearer secure the bow and lenses in operative position on a wearer. An exterior surface on the bow faces upwardly with solar panels located therein adapted to generate electrical energy. An interior face on the bow faces inwardly towards the user with at least one temperature/time indicator above one lens.

4 Claims, 4 Drawing Sheets

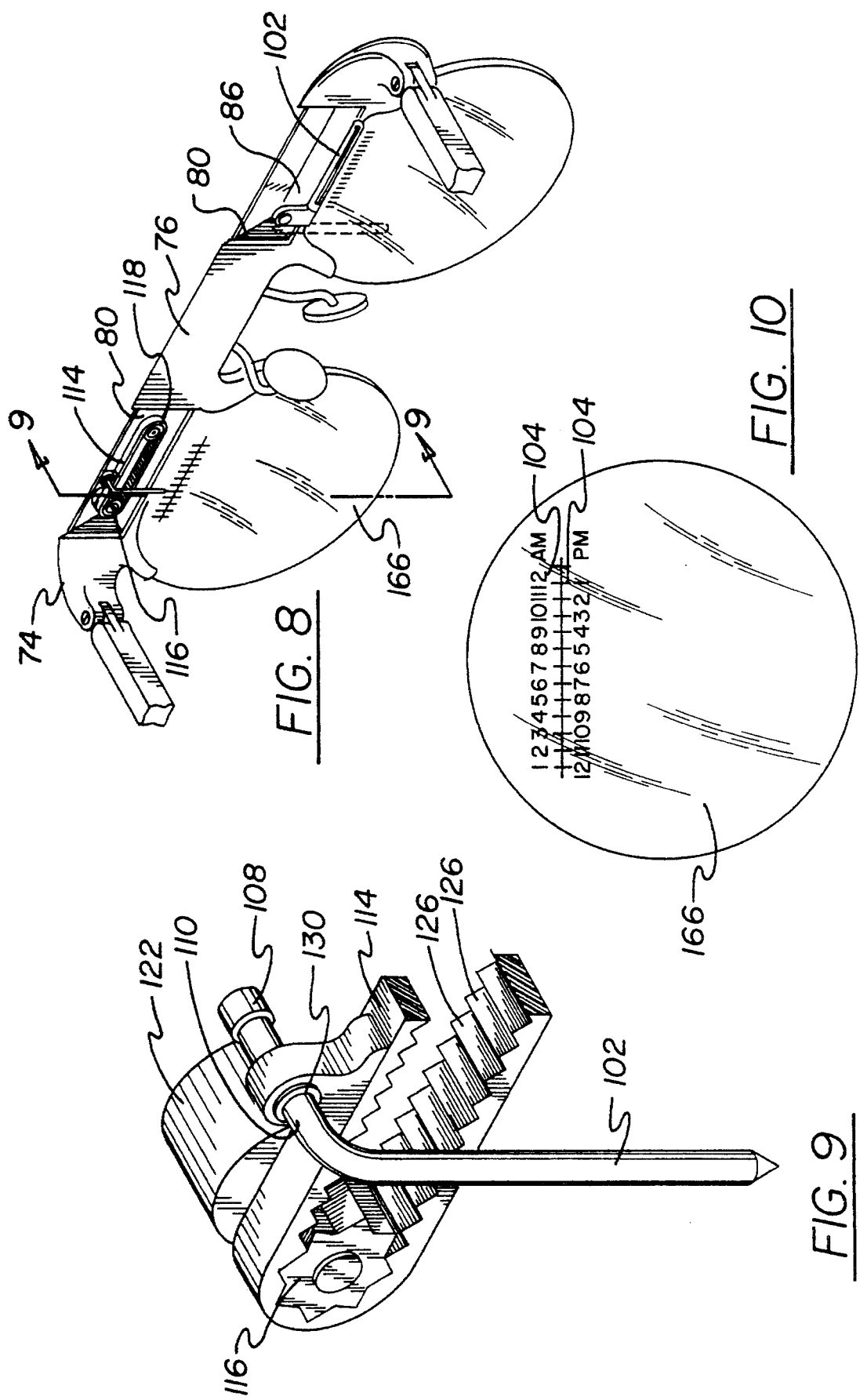

EYE GLASS SYSTEMS WITH INTEGRAL TIME/TEMPERATURE COMPONENTS

BACKGROUND OF THE INVENTION

1. Field of the Invention

The present invention relates to eye glass systems with integral time/temperature components and more particularly pertains to displaying information in association with one's eye pieces.

2. Description of the Prior Art

The use of eye pieces with information displays is known in the prior art. More specifically, eye pieces with information displays heretofore devised and utilized for the purpose of displaying information by components located within one's eye glasses are known to consist basically of familiar, expected, and obvious structural configurations, notwithstanding the myriad of designs encompassed by the crowded prior art which has been developed for the fulfillment of countless objectives and requirements.

By way of example, in U.S. Pat. No. 4,354,744 to Bonomi discloses a frame for eyeglasses.

U.S. Pat. No. 4,526,483 to Zahn, III, discloses a heads up sports timer with electronic time display.

U.S. Pat. Nos. 4,751,691 and 4,867,551 both to Perera disclose an optical projection time-piece attachment for spectacles or combination thereof and a display projection optical system for spectacles or sunglasses.

Lastly, U.S. Pat. N. 5,033,818 to Barr discloses an electronic diving system and face mask display.

In this respect, the eye glass systems with integral time/temperature components according to the present invention substantially depart from the conventional concepts and designs of the prior art, and in doing so provide an apparatus primarily developed for the purpose of displaying information in association with one's eye glasses.

Therefore, it can be appreciated that there exists a continuing need for new and improved eye glass systems with integral time/temperature components which can be used for telling the time and/or temperature by components located within one's eye glasses. In this regard, the present invention substantially fulfills this need.

SUMMARY OF THE INVENTION

In view of the foregoing disadvantages inherent in the known types of eye pieces with information displays now present in the prior art, the present invention provides improved eye glass systems with integral time/temperature components. As such, the general purpose of the present invention, which will be described subsequently in greater detail, is to provide new and improved eye glass systems with integral time/temperature components which have all the advantages of the prior art and none of the disadvantages.

To attain this, the present invention essentially comprises a new and improved eye glass system with an integral time/temperature component comprising, in combination, eye glasses formed with a bow at a central extent thereof positionable above the eyes of a wearer. Lenses are positionable with the bow in front of the eyes of the wearer and with temples extending rearwardly from the ends of the bow positionable over the ears of the wearer to secure the bow and lenses in operative position on a wearer. An exterior surface on the bow faces upwardly with solar panels located therein adapted to generate electrical energy. An interior face on the bow faces inwardly towards the user with a temperature indicator above one lens and a time indicator above the other lens. The indicators each include a circular dial face with at least one hand for pointing to the information to be read. Electrical means couple the time indicator and the solar panel.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved eye glass systems with integral time/temperature components which have all the advantages of the prior art eye pieces with information displays and none of the disadvantages.

It is another object of the present invention to provide new and improved eye glass systems with integral time/temperature components which may be easily and efficiently manufactured and marketed.

It is a further object of the present invention to provide new and improved eye glass systems with integral time/temperature components which are of durable and reliable constructions.

An even further object of the present invention is to provide new and improved eye glass systems with integral time/temperature components which are susceptible of a low cost of manufacture with regard to both materials and labor, and which accordingly are then susceptible of low prices of sale to the consuming public, thereby making such eye glass systems with integral time/temperature components economically available to the buying public.

Still yet another object of the present invention is to provide new and improved eye glass systems with integral time/temperature components which provide in the apparatuses and methods of the prior art some of the advantages thereof, while simultaneously overcoming some of the disadvantages normally associated therewith.

Still another object of the present invention is to tell the time and/or temperature by components located within one's eye glasses.

Lastly, it is an object of the present invention to provide new and improved eye glass systems with an integral time/temperature component comprising eye glasses formed with a bow at a central extent thereof and positioned above the eyes of a wearer. Lenses positionable within the bow in front of the eyes of the wearer and with temples extending rearwardly from the ends of the bow positionable over the ears of the wearer secure the bow and lenses in operative position on a wearer. An exterior surface on the bow faces upwardly with solar panels located therein adapted to generate electrical energy. An interior face on the bow faces inwardly towards the user with at least one temperature/time indicator above one lens.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is a perspective view of the eye glasses shown in FIG. 7 taken from the opposite side thereof.

FIG. 9 is a perspective view of one end of the clock shown in FIG. 8 taken along line 9—9 of FIG. 7.

FIG. 10 is a front elevational view of the eye glass taken along line 9—9 of FIG. 8.

The same reference numerals refer to the same parts through the various Figures.

DESCRIPTION OF THE PREFERRED EMBODIMENT

Figure 1:
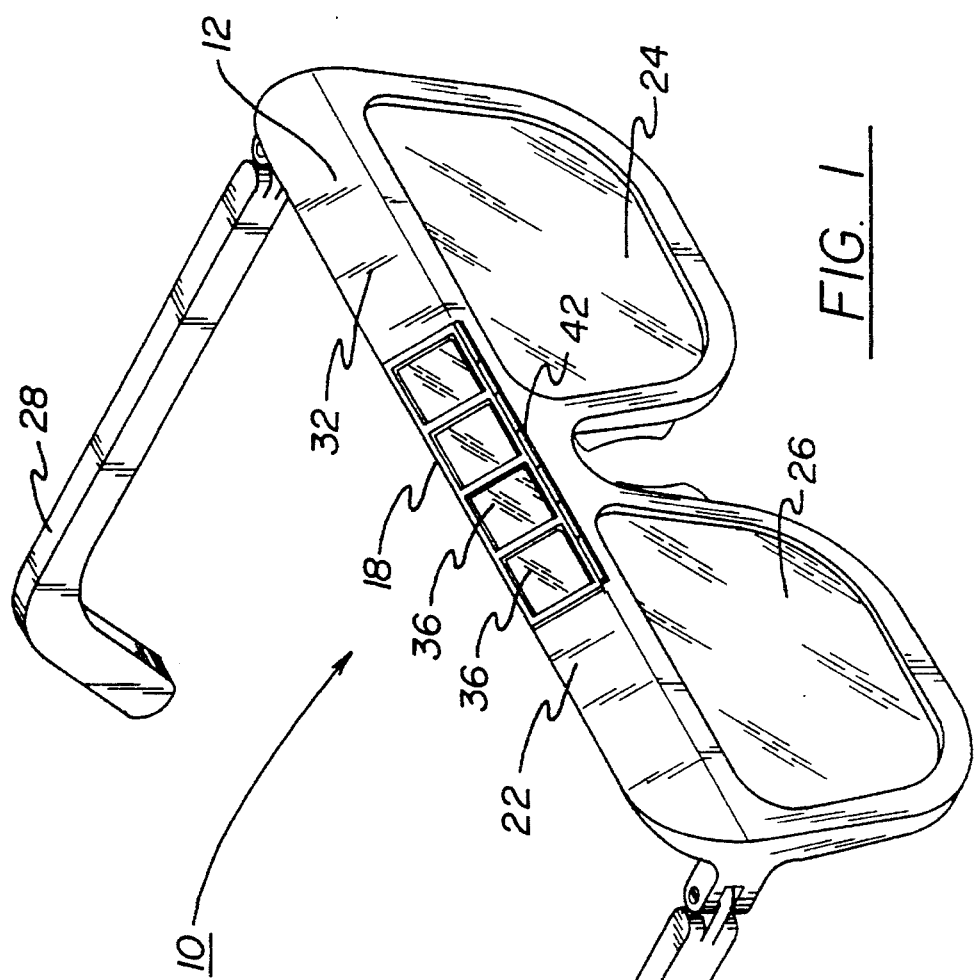
FIG. 1 is a perspective illustration of the preferred embodiment of the new and improved eye glass system with integral time/temperature components constructed in accordance with the principles of the present invention.
Figure 2:
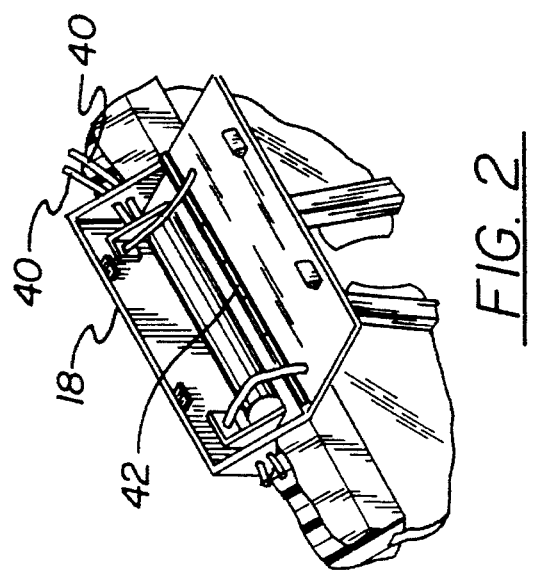
FIG. 2 is an enlarged perspective view of the solar panel section of the eye glasses of FIG. 1 with the panels in an open orientation.
Figure 3:
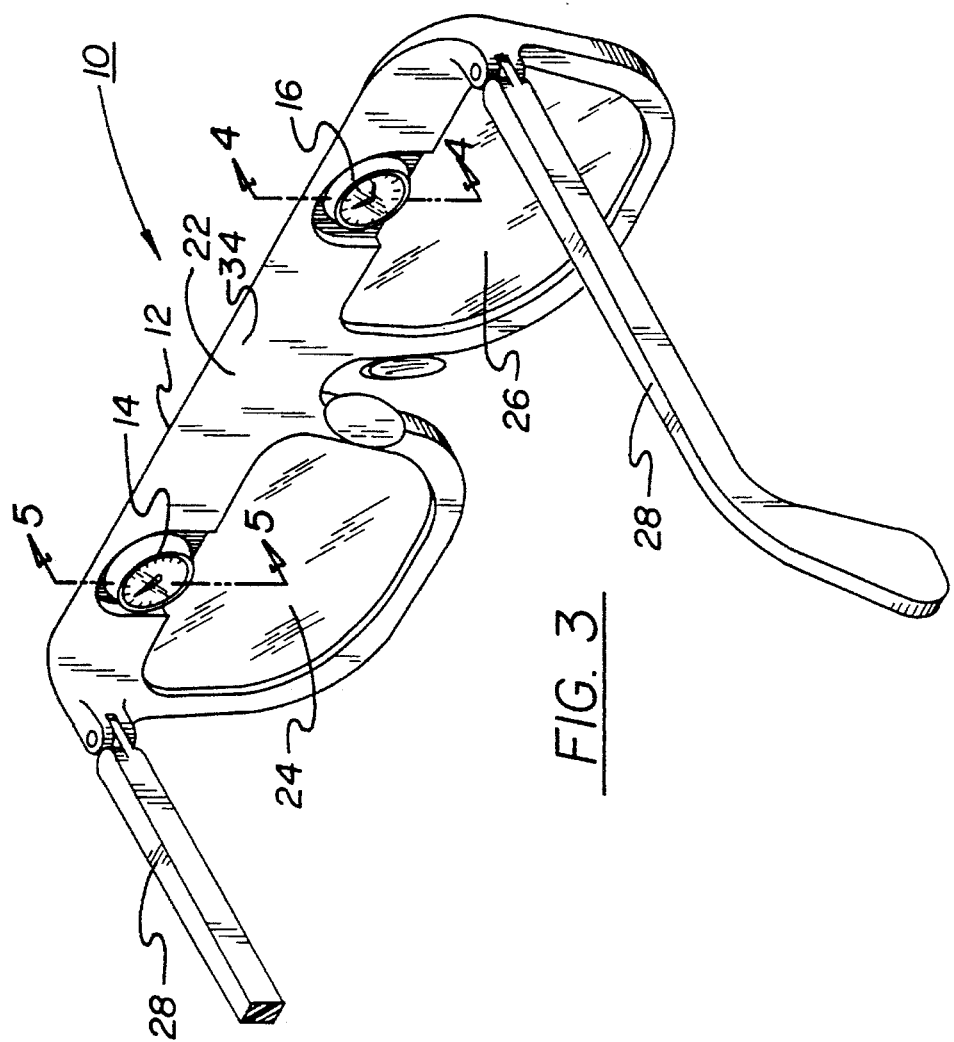
FIG. 3 is a perspective illustration similar to FIG. 1 but viewed from the opposite side thereof.
Figure 5:
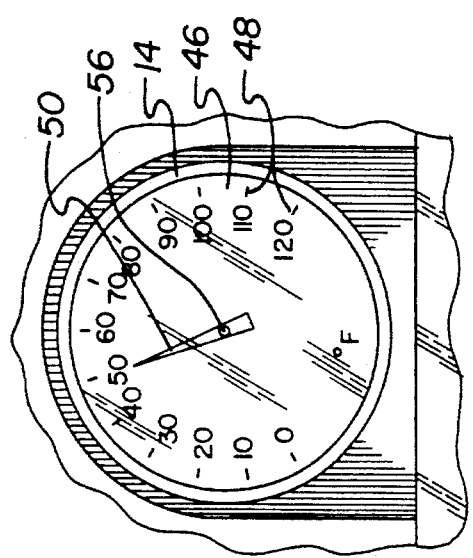
FIG. 5 is a front elevational view taken along line 5—5 of FIG. 3.
Figure 4:
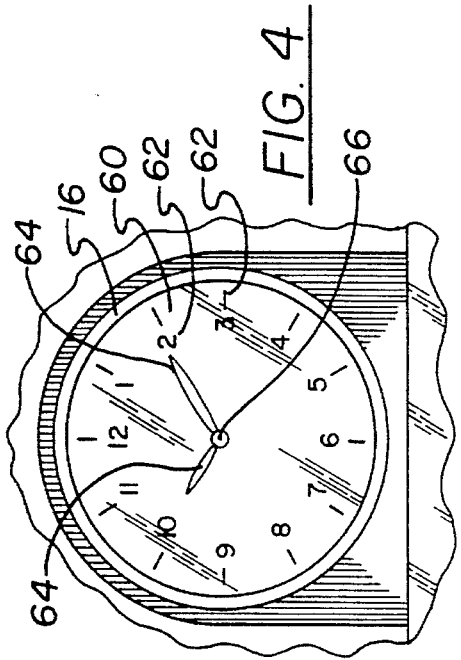
FIG. 4 is a front elevational view taken along line 4—4 of FIG. 3.
Figure 6:
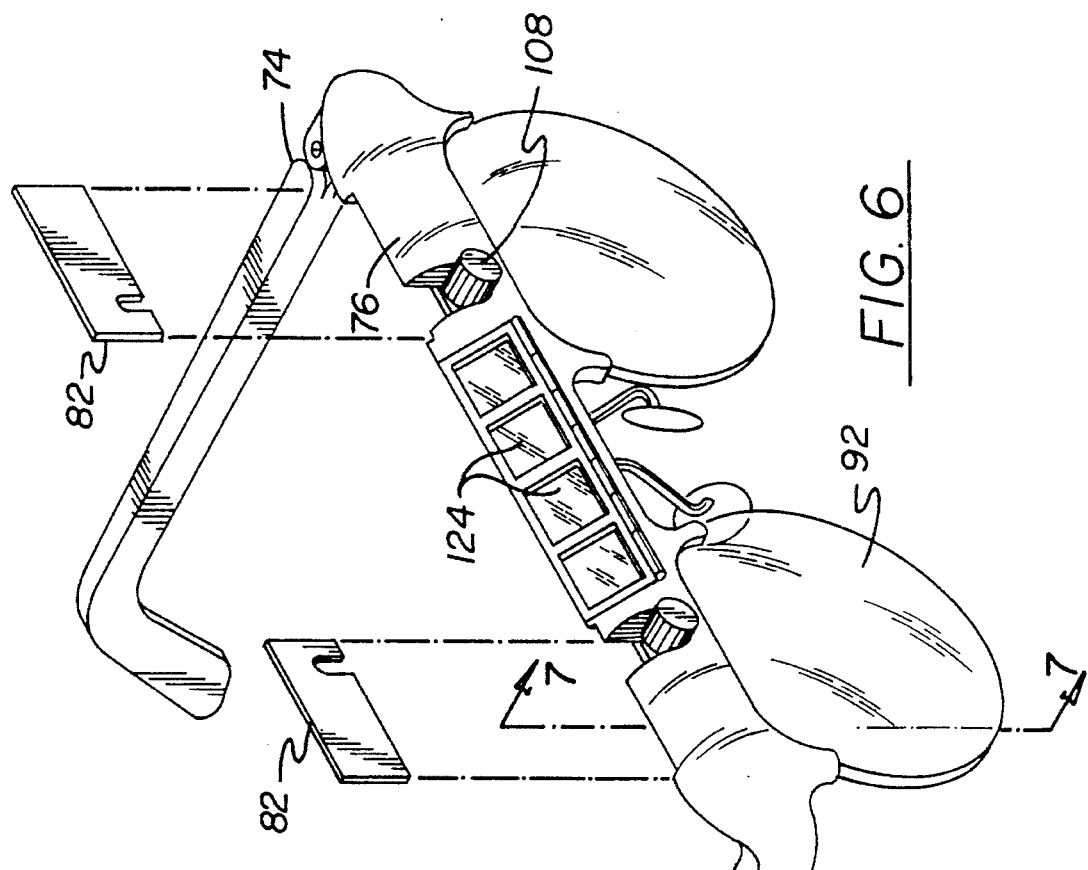
FIG. 6 is a perspective view of a device similar to FIG. 1 but illustrating an alternate embodiment of the invention.
Figure 7:
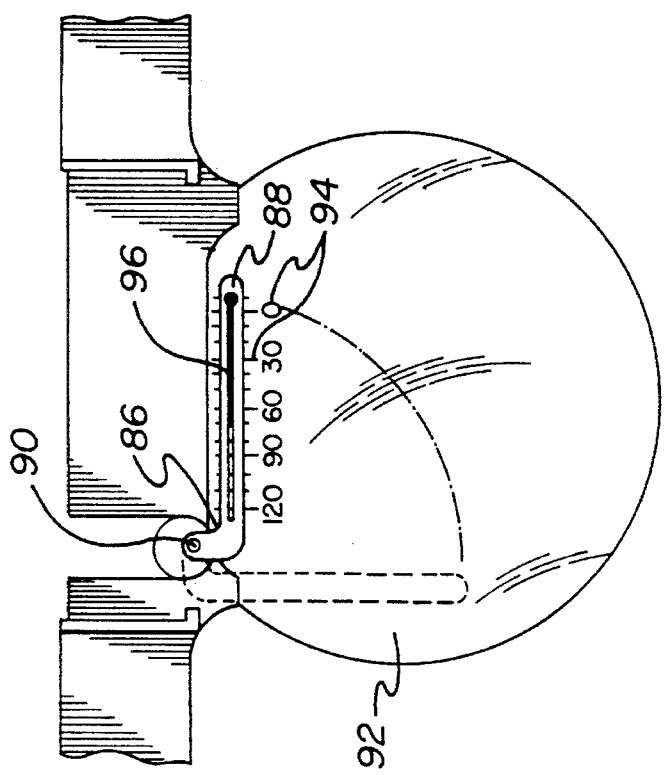
FIG. 7 is an enlarged front elevational view of the thermometer taken along line 7—7 of FIG. 6.

With reference now to the drawings, and in particular to FIG. 1 thereof, the preferred embodiment of the new and improved eye glass system with integral time/temperature components embodying the principles and concepts of the present invention and generally designated by the reference numeral 10 will be described.

Specifically, it will be noted in the various Figures that the system 10 of the present invention, the new and improved eye glass system with integral time/temperature components, has its central component, a frame 12. The other major components are the information bearing components 14 and 16 for displaying the temperature and time. The last major component of the system is the solar panel 18. These components of the system 10 are individually configured and arranged with respect to each other to achieve the intended objectives.

More specifically, the frame 12 is comprised of a bow 22, lenses 24 and 26 and temples 28. The bow is a linear member positioned at a central extent of the frame. It is adapted to be positioned on the wearer above the eyes. The lenses, whether corrective lenses or colored lenses for protecting the eyes from the glare of the sun, are secured to the bow for depending downwardly in front of the eyes of the wearer to achieve their normal intended functions. Lastly, temples 28 are secured to the ends of the bow. The temples are adapted to be positioned over the ears of a wearer to secure the bow and lenses in operative position over the eyes of a wearer.

The bow of the frame has an exterior surface 32 and an interior surface 34. The exterior surface 32 is formed with a plurality of solar panels 36 facing in an upward direction. In this manner, they are best positioned for receiving the light rays from the sun. When received, the light rays are converted in the conventional manner into electrical energy. Such electrical energy is conveyed by lines 40 to an appropriate indicator for power. A hinge 42 functions to expose the interior components of the solar panels for repair and/or construction.

The temperature indicator 14 is provided with a planar face 46 having indicia 48 thereon indicative of the temperature. Centrally located on the face 48 is a single hand 50 pivoted at an axis 56 whereby the hand 50 will point to the indicia indicative of the ambient temperature.

The time indicator 16, a clock, includes a planar face 60 with indicia 62 thereon. A pair of hands 64, a long hand and a short hand, are pivotally secured to the face 60 through an axis 66. Time is indicated in the conventional manner by the movement of the hands with respect to the indicia.

Both the temperature indicator and the time indicator are located in the interior face 34 at locations above an associated lens 24 and 26 for being read by the user by simply looking upwardly from the lenses to read faces of one indicator or the other to determine the temperature or the time of the day.

An alternate embodiment is shown in FIGS. 6 through 10. In such alternate embodiment, the frame 74 is of a modified construction insofar as its bow 76 is concerned. Such bow 76 is provided with recesses 80. Over such recesses, removable plates 82 shield the operating components within the recesses from dirt and contamination for extended life.

More particularly in this embodiment, the temperature component 86 is formed as a linear container 88. It is pivoted at one end about an axis 90 above one lens 92. On such lens is indicia 94 with regard to the number of degrees depending on the position of the mercury 96 within the container. The axis 90 has a forwardly extending knob 98 rotatable by a wearer which allows the container to be pivoted by a user to a lowered vertical orientation for resetting. It is also moveable by a user to an upper horizontal position for observing the position of the mercury with respect to the indicia 94 on the lens 92 for being read.

The time indicator 86 includes a downwardly projecting pointer 102. The pointer moves in a horizontal path while projecting downwardly. In this manner, it is positioned adjacent indicia 104 formed on the associated lens 106. When in the lower position, the pointer will indicate the time when read in conjunction with the indicia 104 on the associated lens. The pointer is pivotable to a raised position when the time is not to be read. Movement between positions is by a user rotating a knob 108 extending forwardly through the bow 76 with such knob constituting the pivot axis 110 for the pointer.

Movement of the pointer 102 with respect to the indicia 104 is through a belt 114. The belt is mounted on a pair of rotatable sprockets 116 and 118. The sprocket 116 is driven by a motor 122. The motor 122 is powered by the solar panels 124 through electrical lines. The interior of the belt is formed with notches 126 for movement around the sprockets by the driven sprocket 116. The exterior surface of the belt rotatably receives the end of the pointer 102 in a bearing assembly 130 or may be pointed down at all times.

The present invention is a unique, novel, and functional product that features a timepiece mounted in a pair of eyeglasses or sunglasses. The watch is located on the upper section of the right lens of the glasses so that it will not obstruct one's vision, and it can be made either in a miniaturized analog version or a horizontally oriented digital display. The watch is powered by a solar battery, and since one does not wear glasses in a darkened area, this is the ideal application for this type of power. The present invention can be made in any number of attractive designs, and more sophisticated models would feature a watch at the top of one lens and a thermometer at the top of the other.

The present invention can be worn anywhere and has a number of distinct advantages over a conventional watch. For example, it can be worn to the beach, and there will be no unsightly white band left around the wrist as one tans. Further, it can be worn when engaging in a sporting activity, such as golf, or when involved in manual activity, such as hammering to drive home a nail, and the watch will not be subject to damage from impact. In short, it can be worn anywhere where eyeglasses or sunglasses are normally worn and the correct time ascertained at a glance.

The present invention can be simply fabricated, lends itself readily to high volume production and can be inexpensively manufactured.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Pantent of the United States is as follows:

1. A new and improved eye glass system with integral time/temperature components comprising, in combination:

eye glasses formed with a bow at a central extent thereof positionable above the eyes of a wearer, lenses positionable with the bow in front of the eyes of the wearer and with temples extending rearwardly from the ends of the bow positionable over the ears of the wearer to secure the bow and lenses in operative position on a wearer;

an exterior surface on the bow facing upwardly with solar panels located therein adapted to generate electrical energy;

an interior face on the bow facing inwardly towards the user with a temperature indicator above one lens and a time indicator above the other lens, the indicators each including a circular dial face with at least one hand for pointing to the information to be read; and electrical means coupling the time indicator and the solar panel.

2. The system as set forth in claim 1 wherein the temperature indicator includes indicia on one lens and a linear container with mercury, the container being pivoted at one end about an axis above such lens, movement being between a lowered vertical orientation for resetting and an upper horizontal position for observing the position of the mercury with respect to indicia on such lens.

3. The system as set forth in claim 1 wherein the time indicator includes a downwardly projecting pointer moveable horizontally in the path of movement adjacent to associated indicia formed on the associated lens whereby the position of the pointer, when in the lower position, will indicate the time.

4. The system as set forth in claim 3 and further including movement means for the time indicator including a belt with a pair of sprockets for support, one of the sprockets being driven by a motor powered by solar panels with the pointer secured on the exterior surface of the belt, driven by the motor, and guided by the sprockets.

\* \* \* \* \*